July 17, 1928.
S. H. TAYLOR
WATER WHEEL
Filed July 3, 1923
1,677,464
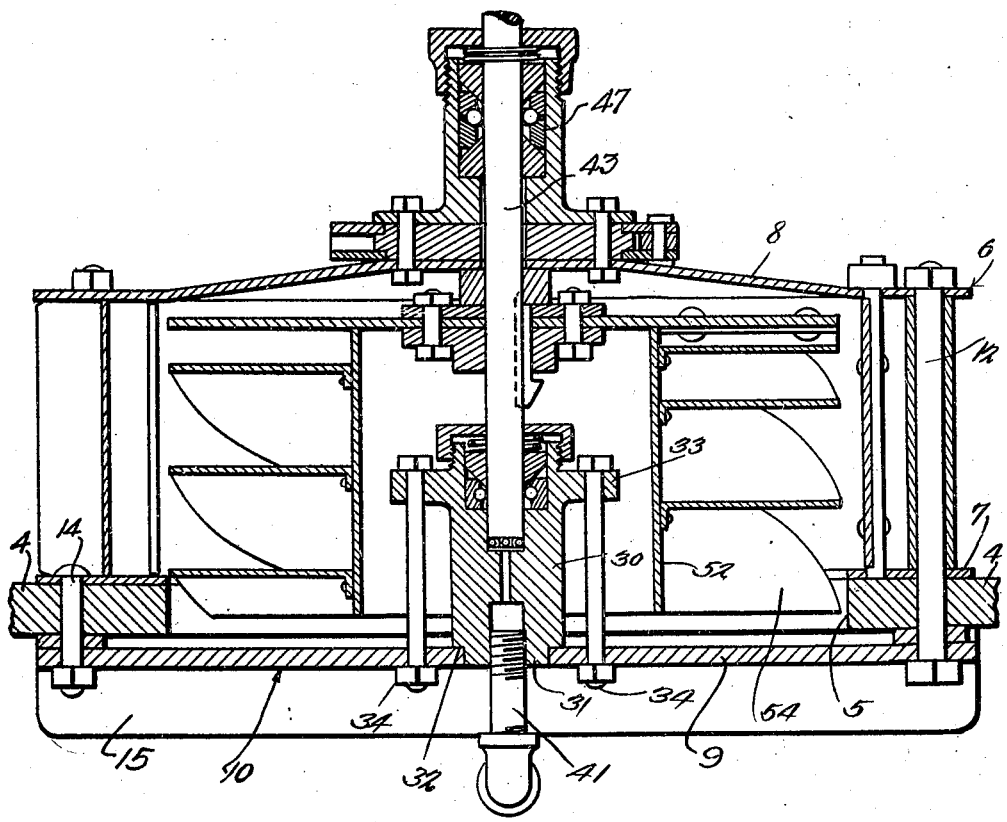
Inventor
S. H. Taylor
C. A. Snow & Co.
Attorneys.

Patented July 17, 1928.

1,677,464

UNITED STATES PATENT OFFICE.

STEPHEN H. TAYLOR, OF LUDLOW, KENTUCKY.

WATER WHEEL.

Application filed July 3, 1923. Serial No. 649,348.

This invention aims to provide a secure anchorage or support for a water wheel, a water wheel casing, and attendant parts; and in the accompanying drawings, the invention is disclosed in a single figure, which is a vertical transverse section, parts being in elevation.

The device forming the subject matter of this application includes a base 4 on which rests the frame 6 of the water wheel, the frame comprising a lower ring 7 and a top plate 8, the ring 7 resting on the base 4. An inverted channel bar 10 is provided, and extends across an opening 5 in the base 4, a securing element 12, such as a bolt passing through the top plate 8, the lower ring 7, the base 4, and the body 9 of the channel bar 10. The channel bar 10 may be attached, by a securing device 14, to the base 4 and to the lower ring 7 of the water wheel frame.

A bearing or post 30 is provided and has a reduced end 31 defining a circumferential shoulder 32. The reduced end 31 of the member 30 is received in the body 9 of the channel bar 10 and the shoulder 32 rests on the body 9. The bearing 30 is provided adjacent to its upper end with an outstanding flange 33. Bolts 34 or the like connect the flange 33 with the body 9 of the channel bar 10. An oil pipe 41 is mounted in the lower end of the bearing 30. The lower end of a shaft 43 enters the bearing 30. The shaft 43 is extended upwardly, to any desired extent, to the place where the power is to be taken off, and the shaft 43 is journaled in a bearing 47 on the top plate 8.

The water wheel 54 comprises a tubular body 52 within which the bearing 30 and attendant parts are located. The water wheel 54 is connected to the shaft 43.

It is to be noted that the lower end of the securing element 14, the lower ends of the securing elements 34, the lower end of the securing element 12, and the connection between the oil pipe 41 and the bearing 30, are all housed beneath the body 9 of the inverted channel bar 10 and between the flanges 15 of the channel bar. The parts specified are, therefore, protected against contact with the flowing water or with anything carried along by the water, through the opening 5, and the chance of loosening the securing elements, or the connection between the oil pipe 41 and the bearing 30 is reduced to a minimum, and the strong anchorage for the water wheel shaft, the casing or frame, and attendant parts, is afforded.

What is claimed is:

In a device of the class described, a base having an opening, an inverted channel bar extended across the opening and including a body and depending flanges, a frame including a top plate and a bottom ring resting on the base, a securing element connecting the top plate, the bottom ring, and the base, with the body of the channel bar, a securing element connecting the bottom ring and the base with the body of the channel bar, a bearing supported on the body of the channel bar, a securing element connecting the bearing with the body of the channel bar, an oil pipe connected to the lower end of the bearing, the juncture between the oil pipe and the bearing and the lower ends of all of the securing elements specified, being housed between the depending flanges of the channel bar, a shaft journaled in the bearing, and a water wheel carried by the shaft, the water wheel including a tubular part into which the bearing extends.

In testimony that I claim the foregoing as my own, I have hereto affixed my signature.

STEPHEN H. TAYLOR.